US012069117B2

(12) United States Patent
Schneider

(10) Patent No.: US 12,069,117 B2
(45) Date of Patent: *Aug. 20, 2024

(54) MEDIA CONTENT SYSTEM FOR TRANSFERRING A PLAYBACK MARKER BETWEEN NETWORK-CONNECTED PLAYBACK DEVICES

(71) Applicant: DISNEY ENTERPRISES, INC., Burbank, CA (US)

(72) Inventor: Evan Schneider, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,974

(22) Filed: Jan. 5, 2022

(65) Prior Publication Data

US 2022/0131918 A1 Apr. 28, 2022

Related U.S. Application Data

(63) Continuation of application No. 16/583,138, filed on Sep. 25, 2019, now Pat. No. 11,223,665.

(51) Int. Cl.
*H04L 65/613* (2022.01)
*H04N 21/2387* (2011.01)

(52) U.S. Cl.
CPC ....... *H04L 65/613* (2022.05); *H04N 21/2387* (2013.01)

(58) Field of Classification Search
CPC ... H04L 65/613; H04L 12/2805; H04L 65/60; H04N 21/41; H04N 21/422;
(Continued)

(56) References Cited

U.S. PATENT DOCUMENTS 8,892,691 B2 * 11/2014 Pantos ................ G06F 16/4387
709/219
9,961,374 B2 * 5/2018 Kalmanje ............ H04N 21/231
(Continued)

FOREIGN PATENT DOCUMENTS

| CN | 103155521 A | 6/2013 |
| CN | 106998490 A | 8/2017 |

(Continued)

OTHER PUBLICATIONS

First Office Action for Japanese Patent Application No. 2020-160743 mailed Nov. 18, 2021 (2 pages).
(Continued)

*Primary Examiner* — James N Fiorillo
(74) *Attorney, Agent, or Firm* — Dorsey & Whitney LLP

(57) ABSTRACT

A system for transferring a playback of media content from a first network-connected playback device to a second network-connected playback device is disclosed. The system includes a processor; a computer-readable non-transitory storage media with instructions that cause the processor to perform operations including: receiving, at a media navigation device, a request to transfer a playback marker of the media content from the first playback device to the second playback device; responsive to receiving the request, stopping a playback of the media content on the first playback device, wherein the playback marker indicates a stop timecode within a timeline associated with the media content at which the playback of the media content is stopped on the first playback device; responsive to the media navigation device being within a predetermined distance to the second playback device, automatically resuming playback of the media content on the second playback device at the stop timecode.

22 Claims, 9 Drawing Sheets

(58) Field of Classification Search
CPC .. H04N 21/432; H04N 21/436; H04N 21/637; H04N 21/845; H04N 21/2387; H04N 21/4122; H04N 21/4222; H04N 21/4312; H04N 21/4325; H04N 21/4333; H04N 21/4363; H04N 21/8455; H04N 21/8457; H04N 21/8587; H04N 21/42203; H04N 21/42224; H04N 21/43637; H04N 21/43615; H04N 21/47217; H04N 5/76; H04N 9/79; G11B 27/11; G06F 3/1423; G06F 3/165; H04B 10/114; H04M 1/7241; H03G 3/32; H03G 3/344; H04R 1/406
USPC .......................................................... 709/231
See application file for complete search history.

(56) References Cited

U.S. PATENT DOCUMENTS

| | | | | |
|---|---|---|---|---|
| 10,469,891 | B2 * | 11/2019 | Lanier | H04N 21/431 |
| 11,017,488 | B2 * | 5/2021 | Evans | G06F 16/44 |
| 2003/0023427 | A1 * | 1/2003 | Cassin | H04N 21/8456 |
| | | | | 348/E7.071 |
| 2006/0002681 | A1 * | 1/2006 | Spilo | H04N 21/4305 |
| | | | | 386/220 |
| 2006/0258289 | A1 * | 11/2006 | Dua | H04B 5/77 |
| | | | | 455/41.3 |
| 2008/0201225 | A1 * | 8/2008 | Maharajh | H04M 15/53 |
| | | | | 707/999.102 |
| 2009/0150553 | A1 * | 6/2009 | Collart | H04L 65/612 |
| | | | | 709/229 |
| 2009/0327561 | A1 * | 12/2009 | Groesch | G06F 1/1632 |
| | | | | 710/304 |
| 2010/0251120 | A1 * | 9/2010 | Chelba | H04N 21/47214 |
| | | | | 715/205 |
| 2011/0138282 | A1 * | 6/2011 | Lai | G06F 40/169 |
| | | | | 715/716 |
| 2014/0109127 | A1 | 4/2014 | Kalmanje et al. | |
| 2014/0359075 | A1 * | 12/2014 | Amidei | H04L 65/61 |
| | | | | 709/219 |
| 2015/0185964 | A1 * | 7/2015 | Stout | H04N 21/42203 |
| | | | | 715/716 |
| 2016/0077710 | A1 * | 3/2016 | Lewis | G06F 3/011 |
| | | | | 715/716 |
| 2016/0234295 | A1 * | 8/2016 | Ziring | G06Q 30/0255 |
| 2017/0187771 | A1 * | 6/2017 | Falcon | H04L 65/1083 |
| 2017/0192739 | A1 * | 7/2017 | Gossain | H04L 65/762 |
| 2017/0208363 | A1 | 7/2017 | Glazier et al. | |
| 2017/0244992 | A1 * | 8/2017 | Deshpande | H04N 21/8545 |
| 2018/0288466 | A1 * | 10/2018 | Monnerat | H04N 21/41265 |
| 2018/0329673 | A1 * | 11/2018 | Reilly | G05B 15/02 |
| 2019/0012069 | A1 * | 1/2019 | Bates | H04N 21/2368 |
| 2019/0075333 | A1 * | 3/2019 | Kalmanje | H04N 21/21805 |
| 2019/0132639 | A1 * | 5/2019 | Panchaksharaiah | H04N 21/47217 |
| 2019/0208233 | A1 | 7/2019 | Gratton et al. | |
| 2019/0349380 | A1 * | 11/2019 | Thomas | H04W 12/63 |
| 2019/0354762 | A1 * | 11/2019 | Bolaki | H04N 21/814 |
| 2020/0201495 | A1 * | 6/2020 | Coffman | G06F 3/167 |
| 2020/0220914 | A1 * | 7/2020 | Carrigan | G06F 3/04883 |
| 2020/0387210 | A1 * | 12/2020 | Chai | G06F 1/3212 |
| 2022/0190801 | A1 * | 6/2022 | Wahlberg | G06F 3/165 |

FOREIGN PATENT DOCUMENTS

| | | |
|---|---|---|
| CN | 109275021 A | 1/2019 |
| CN | 110166820 A | 8/2019 |
| JP | 2007228395 A | 9/2007 |
| JP | 2013168110 A | 8/2013 |

OTHER PUBLICATIONS

Extended European Search Report for Application No. 20197933.3 mailed Feb. 12, 2021 (8 pages).
"Airplay", http://www.apple.com/airplay/, Sep. 20, 2019.
"How Do I Use My Mobile Device to Watch Netflix on my TV?" https://help.netflix.com/en/node/49, Sep. 20, 2019.
"How to Pair YouTube on a Mobile Device to a TV without Chromecast", https://www.androidcentral.com/pairing-youtube-mobile-device-tv-without-chromecast, Sep. 20, 2019.

* cited by examiner

MEDIA CONTENT SYSTEM FOR TRANSFERRING A PLAYBACK MARKER BETWEEN NETWORK-CONNECTED PLAYBACK DEVICES

CROSS REFERENCE TO RELATED APPLICATIONS

This application claims the benefit of priority pursuant to 35 U.S.C. § 120 of U.S. patent application Ser. No. 16/583,138, filed 25 Sep. 2019, entitled "Media Content System for Transferring a Playback Marker Between Network-Connected Playback Devices," which is hereby incorporated by reference herein in its entirety.

BACKGROUND

Field

This disclosure generally relates to the field of audio/visual ("A/V") equipment. More particularly, the disclosure relates to an A/V system that transfers playback of media content.

General Background

With recent advances in technology, media content (e.g., movies, shows, music, etc.) received via the Internet may be consumed through different devices in the same general vicinity. For example, a conventional home network configuration may allow for multiple televisions in the same home to view content received via the Internet. Yet content playback amongst those multiple devices is typically performed in an uncoordinated manner. For example, a user may start streaming a movie on a television in his or her dining room. In the middle of playing back the movie, that user may then want to move to his or her den and continue watching the movie on a television in the den. In some conventional configurations, such a change necessitates the user stopping playback of the movie on the television in the dining room, and restarting playback of the movie on the television in the den from the beginning of the movie. Accordingly, the user's place in the movie is essentially lost. Not wanting to have to watch the movie all the way from the beginning, the user is often left with having to try to find his or her previous spot in the content with multiple fast forward and rewind commands. Such user interaction typically does not result in continuing playback at the exact spot in which playback on the living room television was stopped, and even if it did, the user may experience frustration about having to go through the inconvenience of such user interaction.

Accordingly, conventional media payback configurations are limited to allowing multiple playback devices in a user environment to perform playback in a disjointed manner. Therefore, conventional systems do not adequately coordinate playback of media content in a user environment with multiple devices connected to a network.

SUMMARY

In one embodiment, a system for transferring a playback of media content from a first network-connected playback device to a second network-connected playback device is provided. The system includes one or more processing elements; a computer-readable non-transitory storage media encoded with instructions that when executed cause the one or more processing elements to perform operations including: receiving, at a media navigation device, a request to transfer a playback marker of the media content from the first network-connected playback device to the second network-connected playback device; responsive to receiving the request, stopping a playback of the media content on the first network-connected playback device, wherein the playback marker indicates a stop timecode within a timeline associated with the media content at which the playback of the media content is stopped on the first network-connected playback device; and responsive to the media navigation device being within a predetermined distance to the second network-connected playback device, automatically resuming playback of the media content on the second network-connected playback device at the stop timecode.

In one embodiment, a method including: receiving, at a media navigation device, a request to transfer a playback marker of a media content from a first network-connected playback device to a second network-connected playback device; responsive to receiving the request, stopping a playback of the media content on the first network-connected playback device, wherein the playback marker indicates a stop timecode within a timeline associated with the media content at which the playback of the media content is stopped; and responsive to the media navigation device being within a predetermined distance of the second network-connected playback device automatically resuming playback of the media content on the second network-connected playback device at the stop timecode.

In one embodiment, a media content system is includes a receiver configured to: receive, from a user, a request to transfer a playback marker of a media content from a first network-connected playback device to a second network-connected playback device; and a processor configured to: stop a playback of the media content on the first network-connected playback device responsive to receiving the request, wherein the playback marker indicates a stop timecode within a timeline associated with the media content at which the playback of the media content is stopped, and responsive to the receiver being within a predetermined distance of the second network-connected playback device automatically resume the playback of the media content on the second network-connected playback device at the stop timecode.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

A media content system is provided to transfer a playback marker (i.e., a current timecode within a timeline associated with media content) between network-connected playback devices to resume playback of media content at a different network-connected playback device from that which initiated the playback. In particular, the media content system may be configured to perform playback of media content on the network-connected playback devices via various playback commands. As an example, the media navigation device may be a mobile computing device (e.g., smartphone, tablet device, smartwatch, etc.) that may act as a remote control for transmitting commands to the network-connected playback devices, each of which may be in operable communication with a display device (e.g., a television). The network-connected playback devices may obtain content (e.g., streamed content (live or prerecorded), video on demand ("VOD"), live broadcast, etc.) from a media content server for display on a corresponding display device. Further, the media navigation device may generate a user interface (visual and/or audio) that the user may interact with (touch-based inputs, voice-based inputs, etc.) to provide playback commands as well as a transfer command to transfer the playback marker from one networked-connected playback device to another networked-connected playback device. As another example, the media navigation device may be a smart speaker that acts as a voice command device that transfers the playback marker between the network-connected playback devices. Accordingly, the media content system, in particular, the media navigation device, allows a user to seamlessly switch media playback between network-connected devices with minimal user interaction, thereby avoiding the inconvenience of previous configurations.

Furthermore, the media content system is platform agnostic, thereby allowing a user to transfer the playback marker between different platforms without restrictions. For example, the playback marker may be transferred between devices on the same WiFi network, based on user proximity regardless of a WiFi network, or based on a server-side transfer encompassing multiple devices logged into one or more accounts hosted by a server.

Figure 1A:
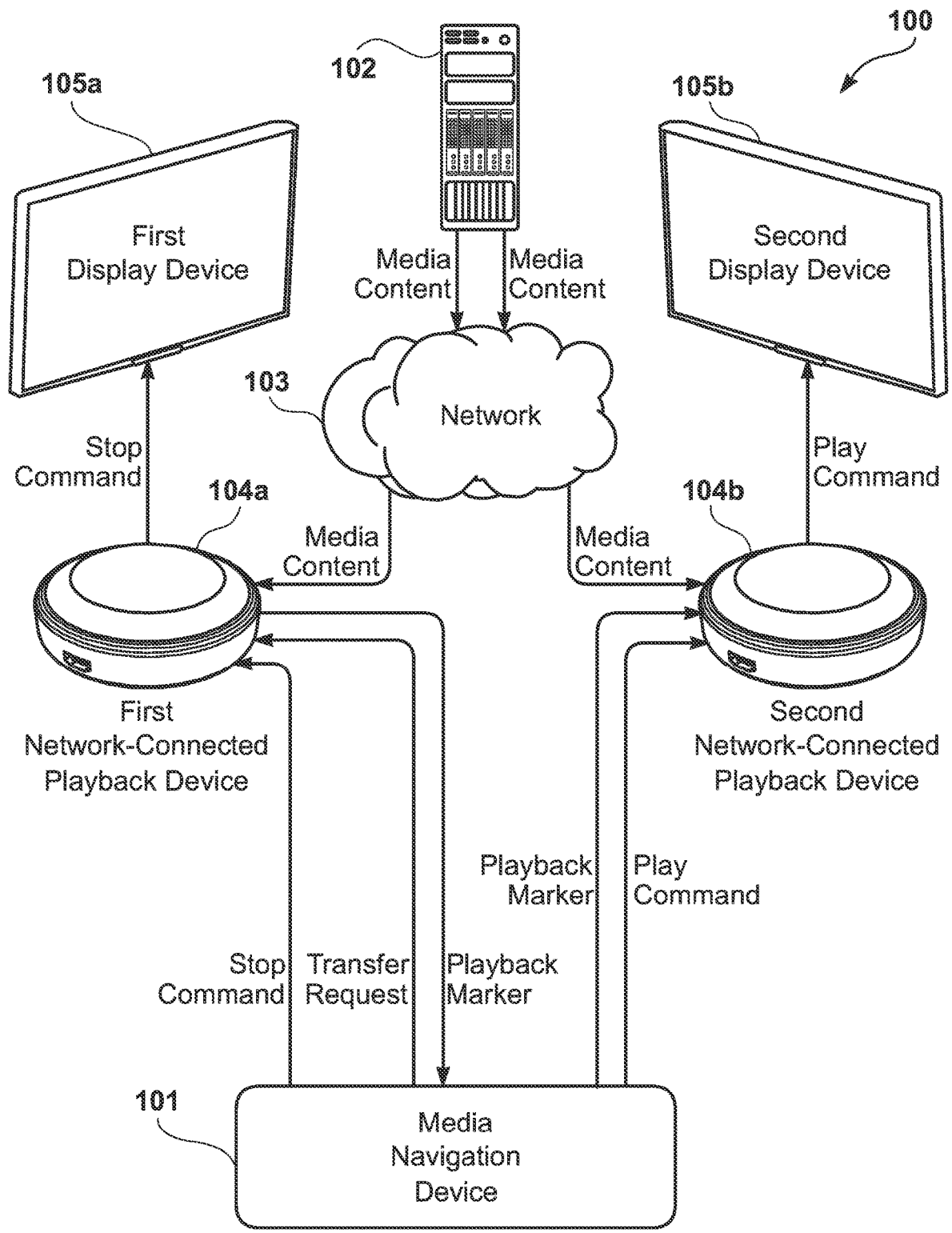
FIG. 1A illustrates a media content system that includes a media navigation device that may communicate directly with a first network-connected playback device and a second network-connected playback device to transfer a playback marker from one network-connected playback device to another.
Figure 1B:
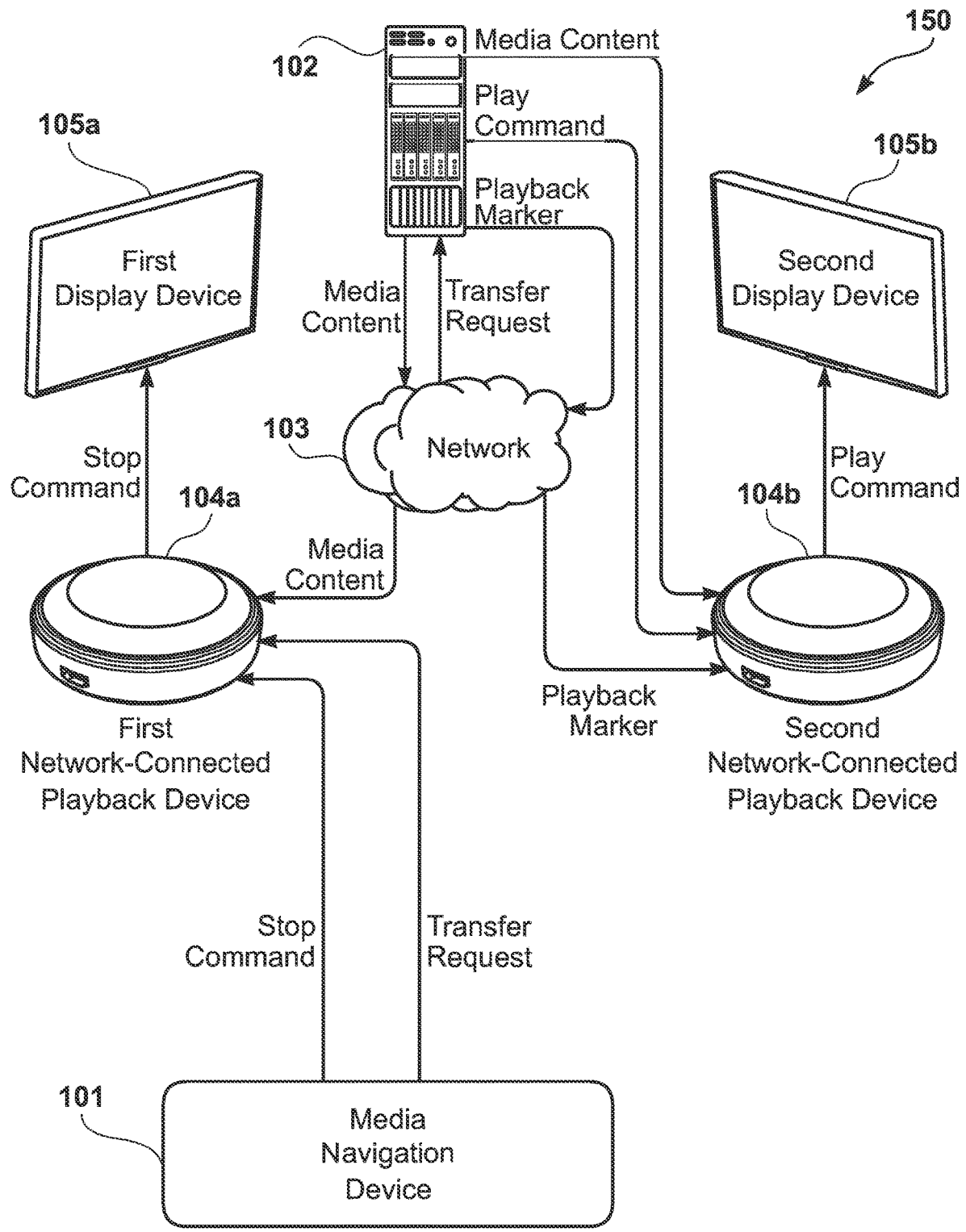
FIG. 1B illustrates a media content system that includes the media navigation device that may communicate with a first network-connected playback device to effectuate an indirect transfer of the playback marker, via the media content server, to the second network-connected playback device.

FIGS. 1A and 1B illustrates examples of media content configurations. For example, FIG. 1A illustrates a media content system 100 that includes a media navigation device 101 that may communicate directly with a first network-connected playback device 104a and a second network-connected playback device 104b to transfer a playback marker from one network-connected playback device to the other. In one embodiment, the media navigation device 101 acts as a remote control for playback of the media content on a first display device 105a (e.g., a first television) in operable communication (e.g., via a wired connection, a wireless connection, etc.) with the first network-connected playback device 104a. Additionally, the media navigation device 101 acts as a remote control for playback of the media content on a second display device 105b (e.g., a second television different from the first television) in operable communication with the second network-connected playback device 104b. For example, the media navigation device 101 may generate commands (e.g., play, stop, pause, rewind, fast forward, etc.) for performing playback of the media content, which may be received by the first network-connected playback device 104a and/or the second network-connected playback device 104b via a media content server 102 through a network 103.

The first network-connected playback device 104a is separate and distinct from the second network-connected playback device 104b (i.e., they are not co-located). The first network-connected playback device 104a and the second network-connected playback device 104b may be, for example, over-the-top ("OTT") media devices that deliver media content via an internet connection. In some examples, the first network-connected playback device 104a and the second network-connected playback device 104b may be OTT media devices that deliver media content via the internet connection from the same OTT platform. In other examples, the first network-connected playback device 104a and the second network-connected playback device 104b may be OTT media devices that deliver media content via the internet connection from two distinct OTT platforms, which are different platforms according to the execution of two different sets of computer executable instructions, not just different by being physically separate. In some examples, the first network-connected playback device 104a and the second network-connected playback device 104b are devices that are not powered by a battery or do not include a battery (e.g., a streaming media stick, a streaming media dongle, a set-top box, a videogame console, a smart television, etc.). In some examples, the first network-connected playback device 104a may be the same type of device as the second network-connected playback device 104b (e.g., both the first network-connected playback device 104a and the second network-connected playback device 104b may be streaming media sticks). In other examples, the first network-connected playback device 104a may be a different type of device than the second network-connected playback device 104b (e.g., the first network-connected playback device 104a may be a streaming media stick, while the second network-connected playback device 104b is a smart television). Although the figures illustrate the first network-connected playback device 104a as separate and distinct from the first display device 105a, in some examples (e.g., a smart television), the first network-connected playback device 104a may be integrated with the first display device 105a. Similarly, although the figures illustrate the second network-connected playback device 104b as separate from the second display device 105b, in some examples (e.g., a smart television), the second network-connected playback device 104b may be integrated with the second display device 105b.

Further, the media navigation device 101 may generate a transfer command that, from the user's perspective, transfers media content from the first display device 105a, which may be positioned in one position within a real-world environment to a second display device 105b, which may be positioned at a second position within the real-world environment. The second position is separate and different from the first position (i.e., the first display device 105a and the second display device 105b are not co-located). In essence, the media navigation device 101 sends a transfer request to the first network-connected playback device 104a, which generates a playback marker that indicates a time at which playback of media content is stopped at the first network-connected playback device 104a. The stop command or the pause command may or may not be configured to automatically invoke the transfer command. Furthermore, the first network-connected playback device 104a may send the playback marker to the media navigation device 101. In one embodiment, the first network-connected playback device 104a may generate a uniform resource locator ("URL") link, which includes the media content and a timecode at which the media content was paused/stopped on the first display device 105a by the first network-connected playback device 104a. Through a wireless or wired communication, the media navigation device 101 may then send the URL link to the second network-connected playback device 104b such that the second network-connected playback device 104b may resume playback at the second display device 105b. The URL may also have additional parameters (e.g., user profile identifier, content identifier, authentication data, etc.) other than the playback marker. In another embodiment, the playback marker may be sent via JAVASCRIPT OBJECT NOTATION ("JSON") key:value pairs. The foregoing embodiments are intended only as examples, given that the playback marker may be sent via a variety of different communication protocols. Moreover, the playback marker may or may not be sent with other data, such as a link to the media content. For example, the playback marker may be sent for content that has already been streamed or downloaded via VOD to a network-connected playback device from the media content server 102. The media navigation device 101 may also send a play command to the second network-connected playback device 104b such that the second network-connected playback device 104b performs playback of the media content at the time indicated by the playback marker (e.g., timecode) within the media content. Alternatively, the second network-configured playback device 104b may be configured to automatically playback the media content at the playback marker without receiving a separate playback command.

FIG. 1B illustrates a media content system 150 that includes the media navigation device 101 that may communicate with a first network-connected playback device 104a to effectuate an indirect transfer of the playback marker, via the media content server 102, to the second network-connected playback device 104b. For instance, the first network-connected playback device 104a may be configured to send the transfer request via the network 103 to the media content server 102, rather than directly to the media navigation device 101 as illustrated in FIG. 1A. The media content server 102 may then generate a playback marker based on the time position within the media content at which a user sent a stop or pause command. Further, the media content server 102 may then send the playback marker to the second network-connected playback device 104b, possibly with a play command, to perform playback of the media content at the timecode associated with the playback marker. Alternatively, the play command may be received from the user at the second network-connected playback device 104b.

The network 103 illustrated in FIG. 1A and FIG. 1B may be a computerized network of remotely situated servers, such as the Internet. Alternatively, the network 103 may be a WiFi network, a mesh network, a peer-to-peer network, or other configuration that allows for communication between the devices illustrated in FIG. 1A and FIG. 1B in a similar manner as illustrated in FIG. 1A and FIG. 1B, or according to a variation therefore. For example, in one embodiment, the first network-connected playback device 104a and the second network-connected playback device 104b may communicate directly with one another over a WiFi network, with one device acting as a server and the other acting as a client.

Further, some of the communications illustrated in FIGS. 1A and 1B may be performed directly between the media navigation device 101 and network-connected playback device devices, rather than through the network 103. For example, the media navigation device 101 may emit a signal via a Near Field Communications ("NFC") transceiver to an NFC transceiver within the first network-connected playback device 104a to request and receive the playback marker. Further, the media navigation device 101 may emit a signal via the transceiver to an NFC transceiver within the second network-connected playback device 104b to send the playback marker. As another example, the media navigation device 101 may display a code (e.g., QR code, barcode, etc.) with the playback marker, and the second network-connected playback device 104b may capture an image of the code to determine the playback marker.

Moreover, the second network-connected playback device 104b is not limited to resuming playback only at the playback marker. Upon resumption at the playback marker, the second network-connected playback device 104b may receive rewind and/or fast forward commands from the user to playback content occurring prior to, or after, the playback marker.

Figure 2:
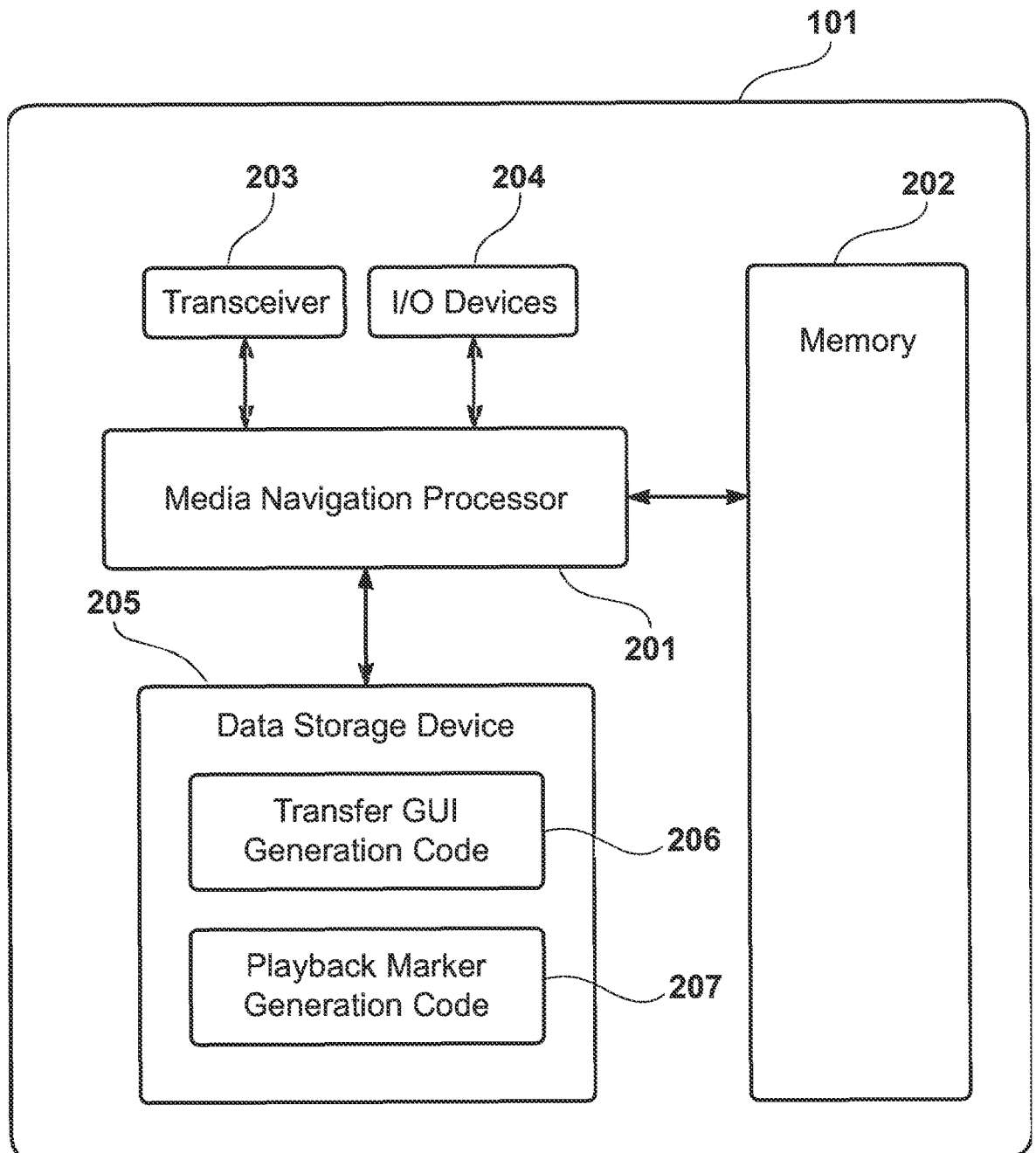
FIG. 2 illustrates a system configuration for the media navigation device illustrated in FIG. 1A.

FIG. 2 illustrates a system configuration for the media navigation device 101 illustrated in FIG. 1A. Alternatively, the system configuration may be used as a computer system for the combination of the media navigation device 101 and the media content server 102 illustrated in FIG. 1B, or by the media content server 102 acting as the sole media navigation device 101. In other words, some of the components illustrated in FIG. 2 may be operate in one physical location, or may communicate in a cloud-based configuration via the network 103 from different physical locations.

The internal components of the media navigation device 101 include a media navigation processor 201, which may be specialized/programmed for navigating media content. For example, the media navigation processor 201 may be programmed to generate commands for consuming media content and/or generating a playback marker in media content.

The media navigation device 101 may also include a memory device 202, which may temporarily store computer readable instructions performed by the media navigation processor 201. As an example of such computer readable instructions, a data storage device 205 within the media navigation device 101 may store transfer GUI generation code 206 and playback marker generation code 207. The media navigation processor 201 may execute the transfer GUI generation code 206 to generate a GUI for transferring the playback marker from the first network-connected playback device 104a to the second network-connected playback device 104b, illustrated in FIGS. 1A and 1B. Furthermore, the media navigation processor 201 may execute the playback marker code 207 to generate a playback marker and/or corresponding delivery mechanism (e.g., URL link, JSON key:value pairs, etc.). Further, the media navigation processor 201 may execute the GUI generation code 206 to generate the GUI without generation of a webpage. Accordingly, the GUI may be generated via a software application that is executed by the media navigation device 101.

Figure 3:
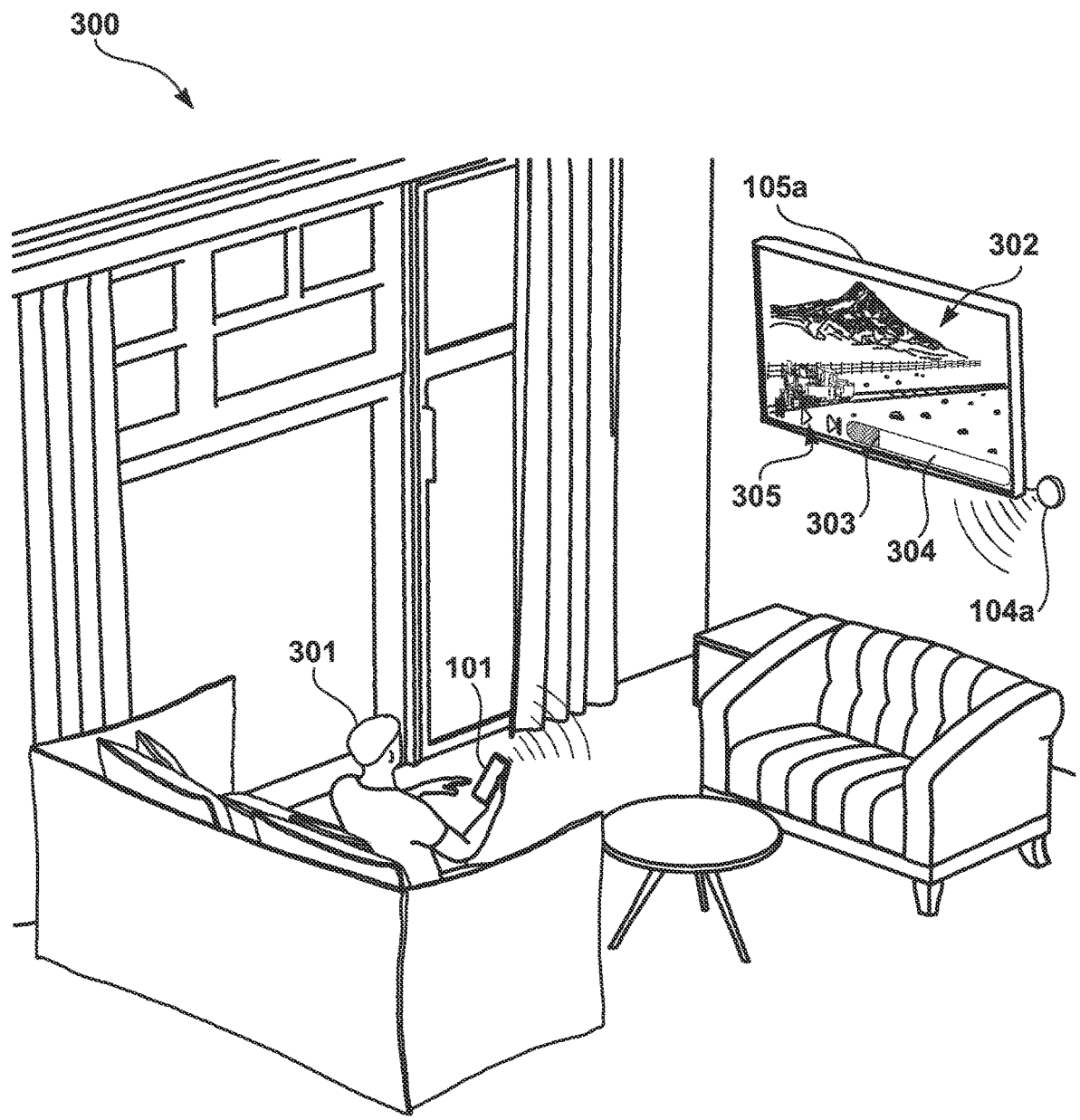
FIG. 3 illustrates an example of a real-world physical environment in which a user uses the media navigation device to navigate media playback of media content displayed by the display device in operable communication with the first network-connected playback device.

FIG. 3 illustrates an example of a real-world physical environment 300 in which a user 301 uses the media navigation device 101 (e.g., a smartphone) to navigate media playback of media content 302 displayed by the display device 105a in operable communication with the first network-connected playback device 104a. For example, the real-world physical environment 300 may be a living room in which the first display device 105a (e.g., television) is positioned for viewing of the media content 302 (e.g., a movie) by the user 301. Further, the user 301 may use the media navigation device 101 as a remote control to select the media content 302 and perform playback operations via a playback command menu 305 (e.g., play, stop, pause, rewind, fast-forward, etc.) thereon during viewing of the media content on the first display device 105a. The display device 105a may also display a timeline 304 and a playback marker 303 within the timeline 304. The playback marker 303 may be an indicium that indicates a timecode value, a relative time position of the media content 302 in the span of the timeline 304, or a quantifiable metric other than a timecode value (e.g., a percentage of viewing completion with respect to a total length or duration of the media content 302).

Figure 4A:
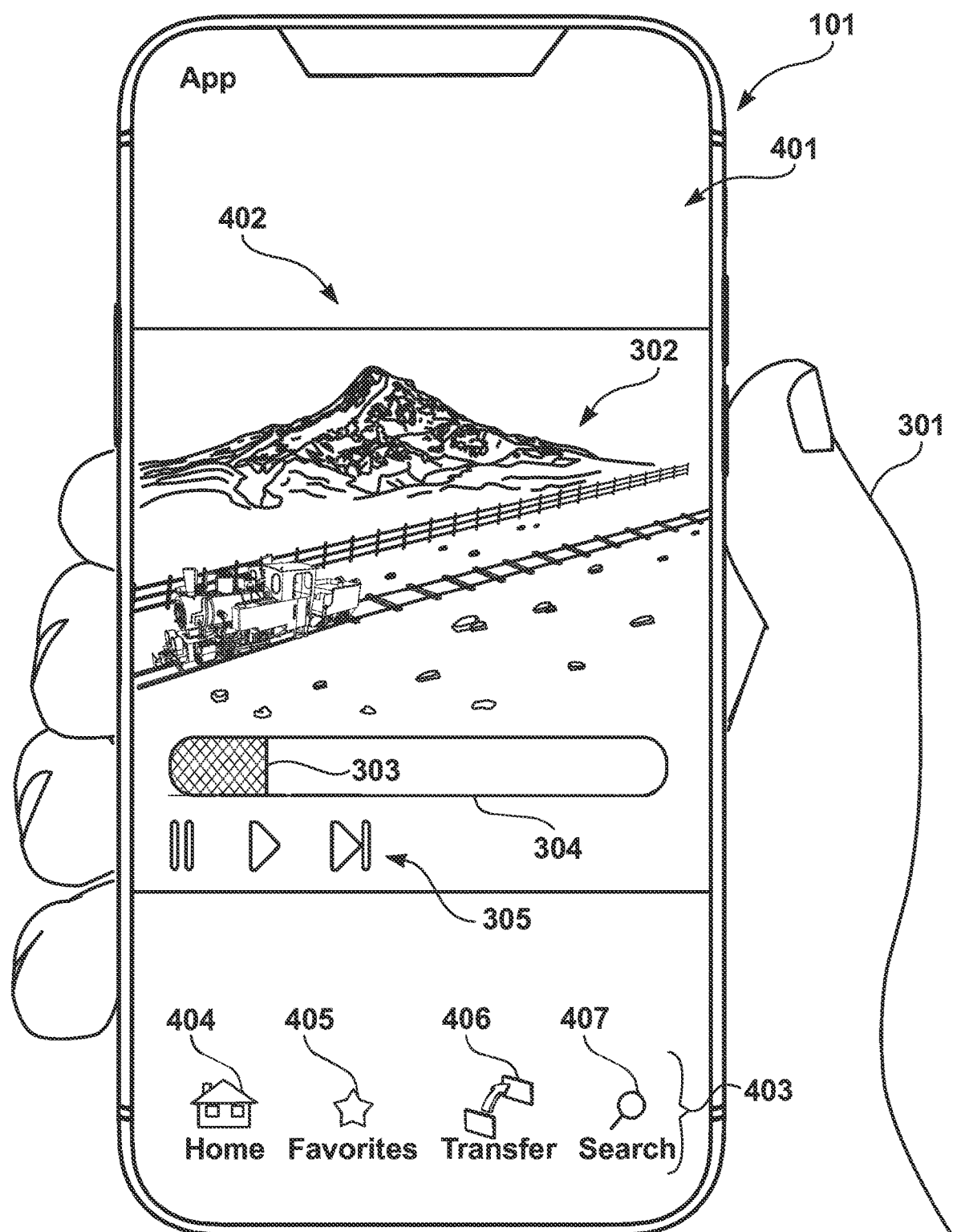
FIG. 4A illustrates a graphical user interface ("GUI") displaying media content along with a timeline indicium, which may be optionally displayed based on a user input.
Figure 4B:
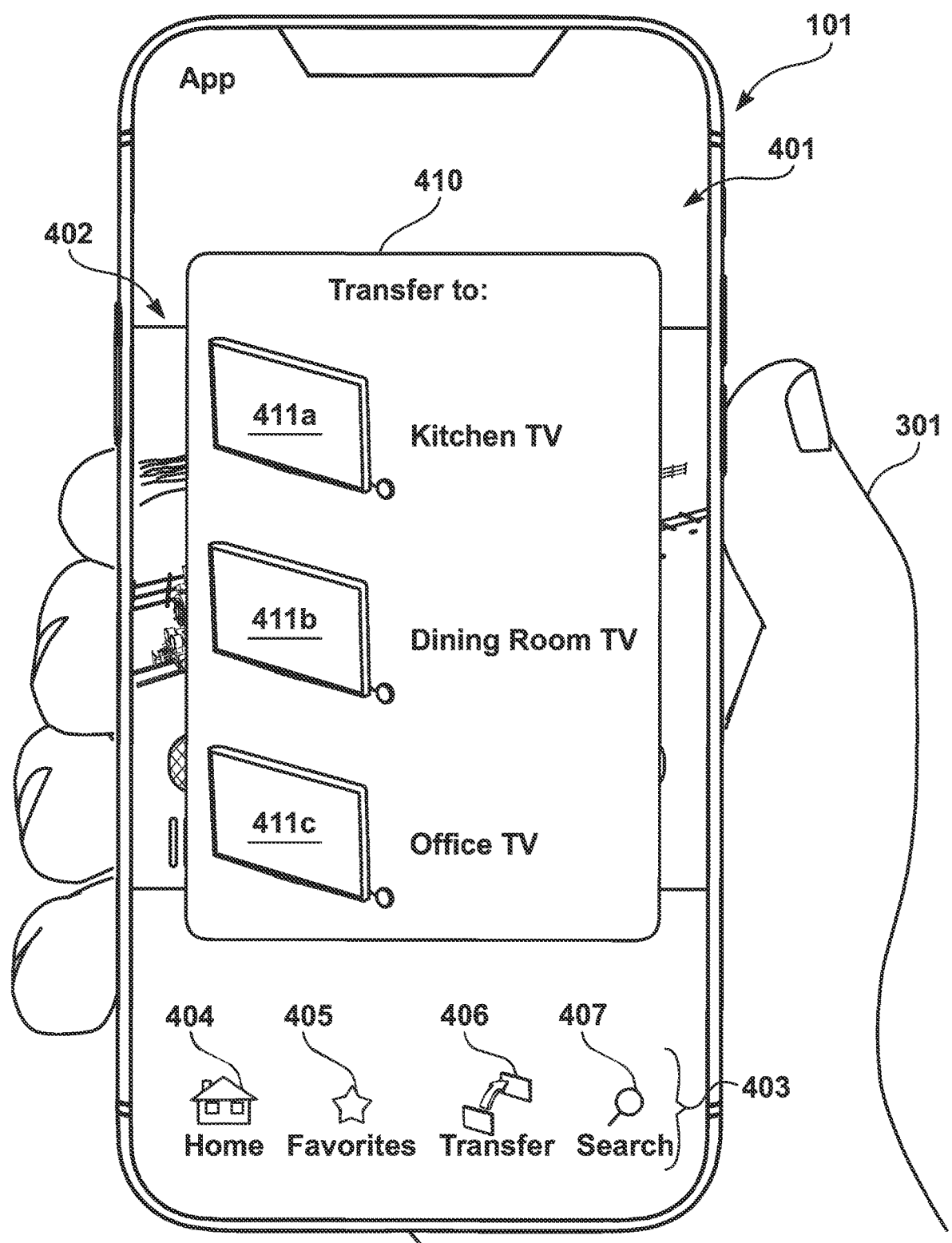
FIG. 4B illustrates a transfer destination menu displayed by the GUI that results from activation of the transfer indicium illustrated in FIG. 4A.

As examples, FIGS. 4A and 4B illustrate a GUI 402 being displayed by a display screen 401 of the media navigation device 101 illustrated in FIG. 3. In particular, FIG. 4A illustrates the GUI 402 displaying media content (e.g., a movie) along with a timeline indicium 304, which may be optionally displayed based on a user input. Further, the GUI 402 may display a menu 403 with various menu indicia (e.g., a home indicium 404, a favorites indicium 405, a transfer indicium 406, and a search indicium 407) without invocation of a webpage. By activating the transfer indicium 406 (e.g., via a touch-based input, gesture, voice input, etc.), the user 301 sends a command via the GUI 402 to display a transfer destination menu 410, as illustrated by FIG. 4B. For example, the transfer destination menu 410 may display one or more destination indicia 411a-411c, each corresponding to a particular display device associated with a network-connected playback device. Each display device may have a unique identifier. Therefore, use of the media navigation device 101, such as a smartphone, is improved by extending the capability of the smartphone to control the transfer of media content at a particular timecode associated with the playback marker 303. Alternatively, the media navigation device 101 may invoke a transfer of the media content without displaying the timeline indicium 303 (i.e., by sending a timecode that is invisible to the user). The particular GUI layout, menu indicia, and other features displayed within the GUI 402 are illustrated only as examples, since variations thereof may be used instead. Further, the display of a scene from the media content 302, the timeline indicium 304, and the playback command menu 305 are optional on the GUI 402. For instance, as an example, the GUI 402 may only include the indicia 404-407.

Figure 5:
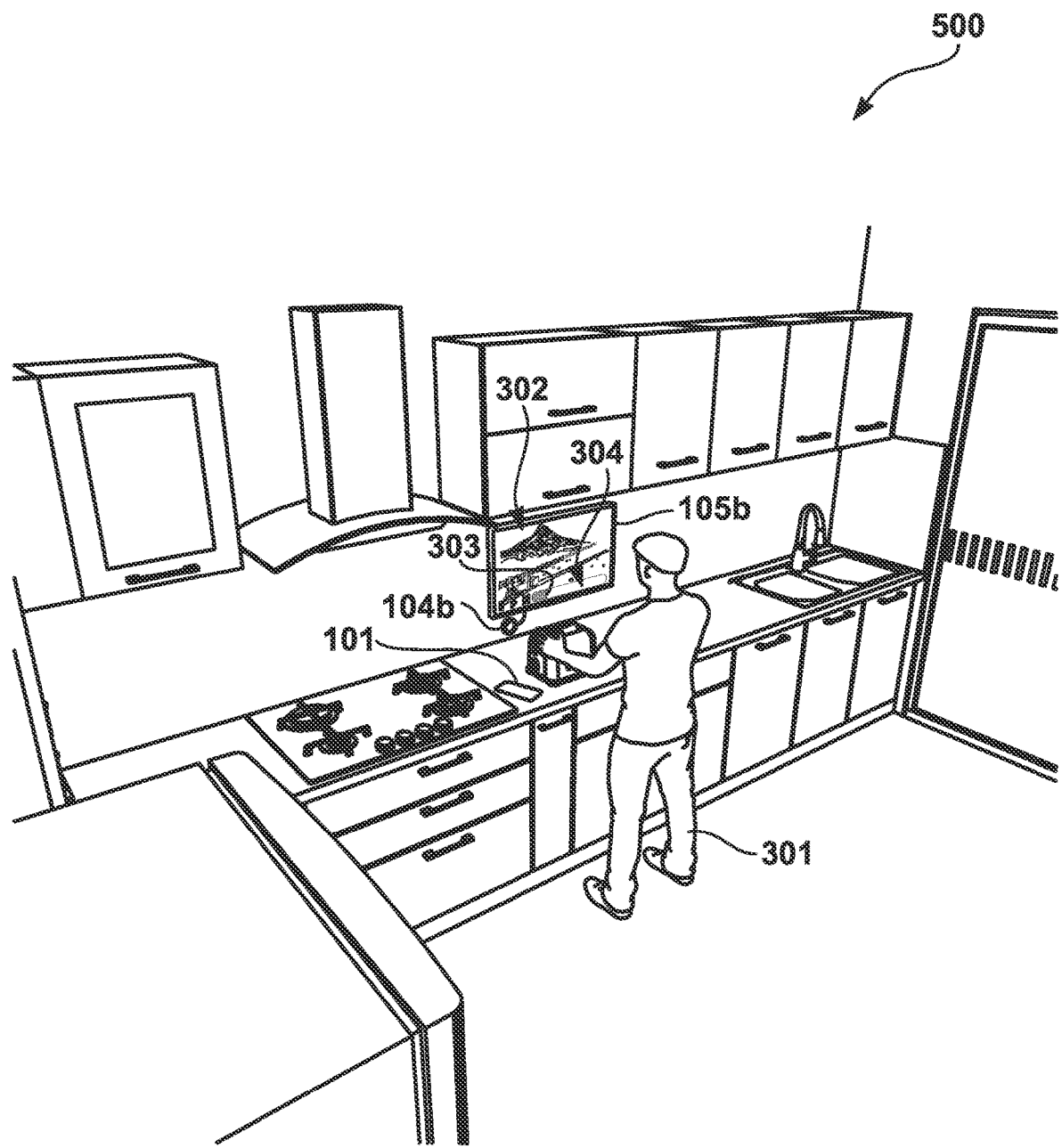
FIG. 5 illustrates an example of a real-world physical environment to which the user requested a transfer of the media content from the real-world physical environment illustrated in FIG. 3 via the GUI illustrated in FIG. 4A and FIG. 4B.

FIG. 5 illustrates an example of a real-world physical environment 500 to which the user 301 requested a transfer of the media content 302 from the real-world physical environment 300, illustrated in FIG. 3, via the GUI 402, illustrated in FIG. 4A and FIG. 4B. For example, the real-world physical environment 500 may be a kitchen in the home of the user 301. After requesting a transfer via the transfer indicium 406 illustrated in FIG. 4A to the network-connected playback device 104b, the media navigation device 101 may transmit the playback marker 303 to the network-connected playback device 104b. In one embodiment, the media navigation device 101 may transfer the playback marker 303 from the media navigation device 101 upon the media navigation device 101 being within a predetermined range (e.g., ten feet) of the second network-connected playback device 104b. As a result, the network-connected playback device 104b may be configured to wait to automatically initiate playback at the timecode associated with the playback marker 303 until the media navigation device 101 is within the predetermined range, rather than initiating playback before the user 301 is within proximity to view the resumption of the playback (i.e., still in the living room or a different room).

Furthermore, in another embodiment, the second network-connected playback device 104b may be configured to automatically initiate playback of the media content at the timecode associated with the playback marker without additional user interaction via additional menus displayed by the second display device 105b. For example, if the second display device 105b is displaying different media content at the time the second network-connected playback device 104b receives the playback marker, the second network-connected playback device 104b may be configured to automatically stop/pause playback of the different media content at the second display device 105b, and automatically initiate playback of the received media content 302 at the timecode associated with the playback marker 303.

In yet another embodiment, the second network-connected playback device 104b may be configured to automatically turn on the power of the second display device 105b upon receiving the playback marker. For example, the user 103 may enter his or her kitchen, where the second display device 105b is powered off, and the second network-connected playback device 104b may automatically turn the television on prior to automatically resuming playback at the timecode associated with the playback marker 303. Furthermore, the first network-connected playback device 104a may be configured to automatically turn off the power of the first display device 105a after the transfer command to transfer the playback marker is generated.

Figure 6:
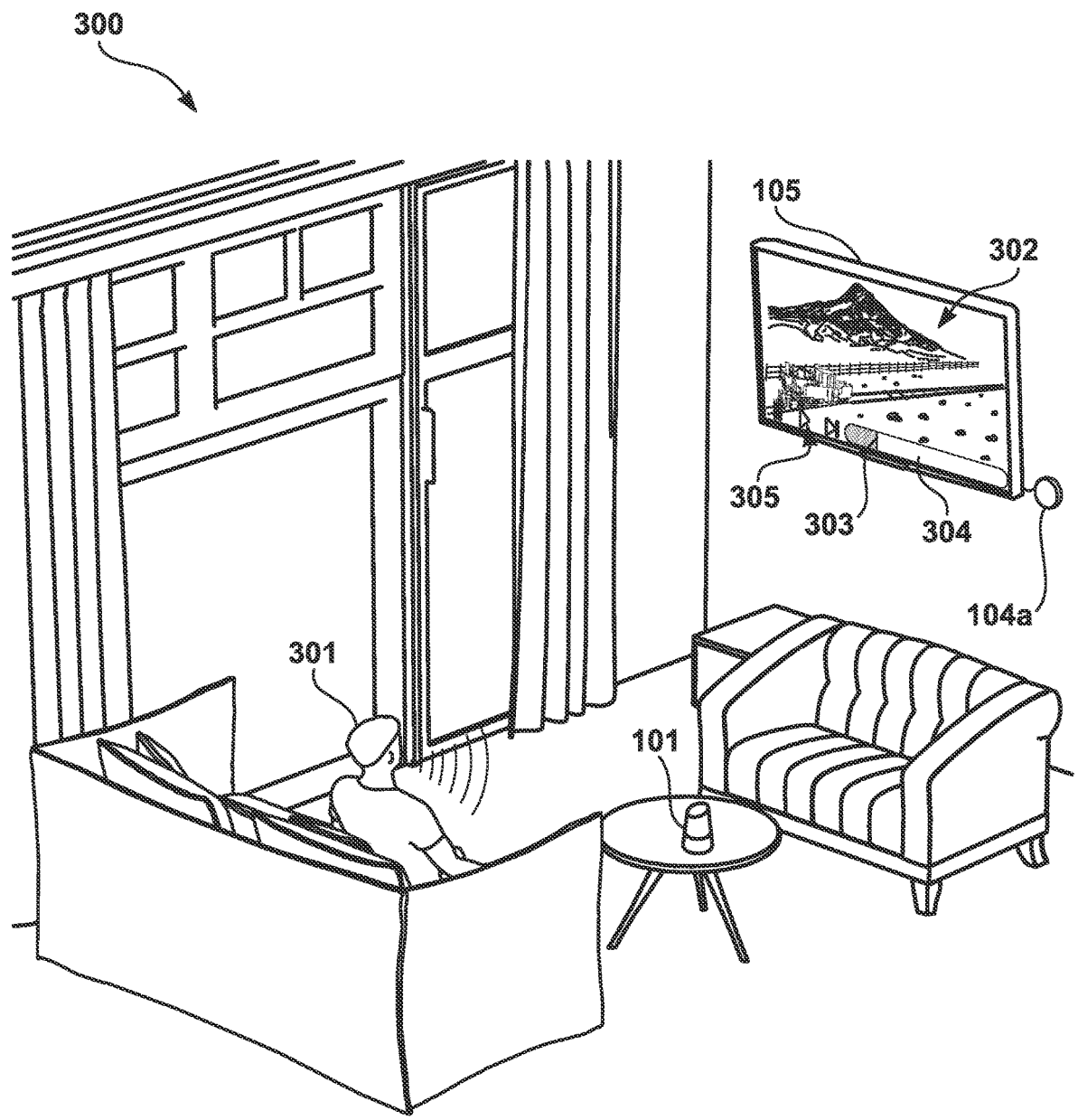
FIG. 6 illustrates the real-world physical environment illustrated in FIG. 3 in which the user uses a smart speaker as the media navigation device to request a transfer of the media content displayed by the first display device to another display device.

FIG. 6 illustrates the real-world physical environment 300 illustrated in FIG. 3 in which the user 301 uses a smart speaker as the media navigation device 101 to request a transfer of the media content displayed by the first display device 105a to the second display device 105b. In particular, the smart speaker may have an audio receiver that receives an audio command from the user to transfer the media content (e.g., "Transfer the movie to the television in the kitchen.") Furthermore, the smart speaker may have an audio transmitter that transmits the audio command to the media content server 102, illustrated in FIG. 1B, which may determine the current timecode in the media content 302 and forward a corresponding playback marker 303 to the second network-connected playback device 104b. The media content server 102 may also transmit a stop/pause command to the first network-connected playback device 104a, and a play command to the second network-connected playback device 104b. Accordingly, in one embodiment, the smart speaker may issue a transfer command, and allow the media content server 102 to issue the playback commands. In another embodiment, the smart speaker may issue both the transfer command and the playback command.

Figure 7:
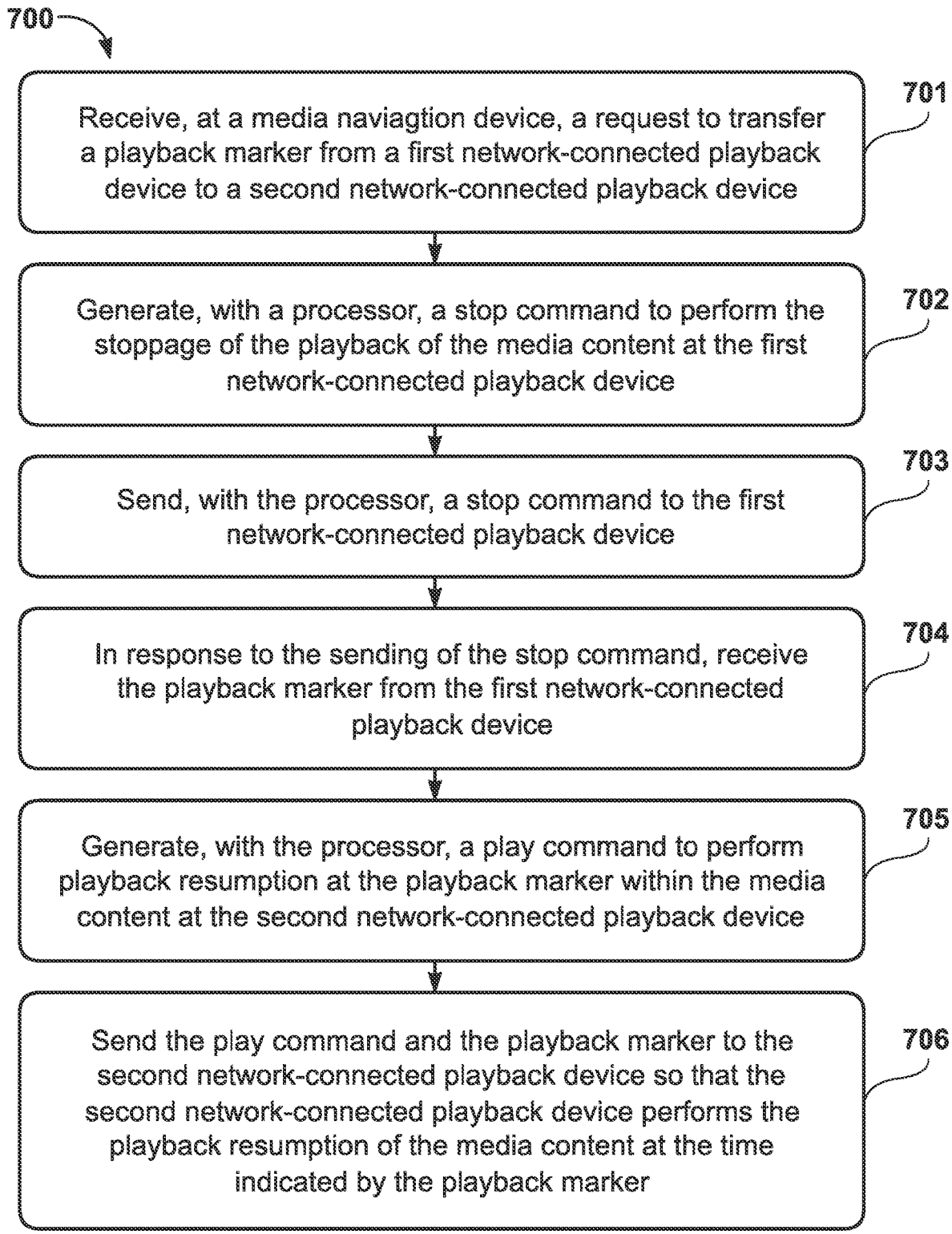
FIG. 7 illustrates a process that the media navigation device, illustrated in FIGS. 1A and 1B, may use to transfer a playback marker from the first network-connected playback device to the second network-connected playback device, illustrated in FIG. 3 and FIG. 5.

FIG. 7 illustrates a process 700 that the media navigation device 101, illustrated in FIGS. 1A and 1B, may use to transfer a playback marker 303 from the first network-connected playback device 104a to the second network-connected playback device 104b, illustrated in FIG. 3 and FIG. 5. At a process block 701, the process 700 receives, at the media navigation device 101, a request to transfer a playback marker 303 from the first network-connected playback device 104a to the second network-connected playback device 104b. The playback marker 303 indicates a time at which playback of media content is stopped at the first network-connected playback device. The time may be a numeric value (e.g., hours, minutes, seconds, etc.) or a relative value (a position within the timeline indicium 304). Further, at a process block 702, the process 700 generates, with a processor, a stop command to perform the stoppage of the playback of the media content 302 at the first network-connected playback device 104a. Moreover, at a process block 703, the process 700 sends, with the processor, the stop command to the first network-connected playback device 104a. At a process block 704, in response to the sending of the stop command, the process 700 receives the playback marker 303 from the first network-connected playback device 104a. Further, at a process block 705, the process 700 generates, with the processor, a play command to perform playback resumption at the playback marker 303 within the media content at the second network-connected playback device 104b. Finally, at a process block 706, the process 700 sends the play command and the playback marker 303 to the second network-connected playback device 104b such that the second network-connected device 104b performs the playback resumption of the media content 302 at the time indicated by the playback marker 303. The user does not have to manually open a browser on the second network-connected playback device 104b or sign into an account on the second network-connected playback device 104b.

The configurations provided for herein may also be applicable to multi-user environments. For example, multiple users (e.g., friends on a social network) at remote locations may each have an account stored by the media content server 102 illustrated in FIGS. 1A and 1B. As the user 103 resumes playback of the media content 302 in the real-world physical environment 500, the media content server 102 may send the playback marker 303 to network-connected playback devices at the remote locations such that the multiple users may share the same viewing/audio experience as the user 103 (i.e., a synchronized viewing/audio experience). Accordingly, the configurations provided for herein are not limited to a one-to-one transfer of the playback marker. The configurations provided for herein allow for a one-to-many transfer of the playback marker.

In the examples described above, the first network-connected playback device 104a and the second network-connected playback device 104b are each located in a residential building (e.g., an apartment, a house, etc.). In other examples, one or both of the first network-connected playback device 104a or the second network-connected playback device 104b may be located in a commercial building, a vehicle, etc.

Various display devices are illustrated herein only as examples. The configurations provided for herein may also be used with other type of media playback devices (e.g., audio playback devices).

The processes described herein may be implemented in a specialized processor. Such a processor will execute instructions, either at the assembly, compiled or machine-level, to perform the processes. Those instructions may be stored on a computer readable medium (e.g., computer readable storage device) capable of carrying those instructions.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

The invention claimed is:

1. A system for transferring a playback of media content from a first network-connected playback device to a second network-connected playback device comprising:
   one or more processing elements;
   a computer-readable non-transitory storage media encoded with instructions that when executed cause the one or more processing elements to perform operations comprising:
   receiving, at a media navigation device, a request to transfer a playback marker of the media content from the first network-connected playback device to the second network-connected playback device, wherein the media navigation device provides a transfer indicium to enable transmission of a respective command to at least one of the first network-connected playback device or the second-network-connected playback device;
   generating, by the media navigation device, a transfer command to cause the first network-connected playback device to transfer the playback marker of the media content from the first network-connected playback device to the second network-connected playback device;
   responsive to the transfer command, stopping a playback of the media content on the first network-connected playback device, wherein the playback marker indicates a stop timecode within a timeline associated with the media content at which the playback of the media content is stopped on the first network-connected playback device;
   generating, by the media navigation device, a play command to resume playback of the media content on the second network-connected playback device at the stop timecode;
   sending the play command and the playback marker to the second network-connected playback device; and
   responsive to receipt of the play command at the second network-connected playback device, automatically resuming playback of the media content on the second network-connected playback device at the stop timecode.

2. The system of claim 1, wherein the first network-connected playback device is a first over-the-top (OTT) device, and the second network-connected playback device is a second OTT device.

3. The system of claim 2, wherein the first network-connected playback device operates on a first OTT platform, and the second network-connected playback device operates on a second OTT platform, the first OTT platform being distinct from the second OTT platform.

4. The system of claim 1, wherein the request is received from a touch-based input or an audio-based input at the media navigation device.

5. The system of claim 1, wherein the media navigation device is in communication with a first network, and the one or more processing elements are configured to perform operations comprising:
configuring a server in communication with a second network to receive the playback marker from the first network-connected playback device via the first network, wherein the first network is in communication with the second network; and
configuring the server to send the playback marker to the second network-connected playback device via the second network.

6. The system of claim 1, wherein the one or more processing elements are configured to perform operations comprising:
receiving, at the first network-connected playback device from a media content server, at least a portion of the media content corresponding to a timecode at or prior to the stop timecode within the timeline associated with the media content; and
displaying, at a display device in operable communication with the first network-connected playback device, the portion of the media content.

7. The system of claim 1, wherein the one or more processing elements are configured to perform operations comprising:
receiving, at the second network-connected playback device from a media content server, at least a portion of the media content corresponding to a timecode after the stop timecode within the timeline associated with the media content; and
displaying, at a display device in operable communication with the second network-connected playback device, the portion of the media content.

8. The system of claim 1, wherein the one or more processing elements are configured to perform operations comprising deactivating a display device in operable communication with the first network-connected playback device after receiving the request to transfer the playback marker.

9. The system of claim 1, wherein the one or more processing elements are configured to perform operations comprising powering up a display device in operable communication with the second network-connected playback device after receiving the request to transfer the playback marker.

10. The system of claim 1, wherein the one or more processing elements are configured to perform operations comprising powering up a display device in operable communication with the second network-connected playback device responsive to the media navigation device being within a predetermined distance of the second network-connected playback device.

11. The system of claim 1, wherein the one or more processing elements are configured to perform operations comprising generating, with the media navigation device, a graphical user interface configured to render the transfer indicium to enable transmission of the respective command to the at least one of the first network-connected playback device of the second network-connected playback device.

12. The system of claim 1, wherein the media content comprises one or more of streamed video, streamed audio, video on demand, or audio on demand.

13. The system of claim 1, wherein the first network-connected playback device and the second network-connected playback device are not configured to be powered by a battery.

14. The system of claim 1, wherein the play command includes an instruction to resume playback of the media content on the second network-connected playback device responsive to the media navigation device being within a predetermined distance to the second network-connected playback device, wherein the playback of the media content on the second network-connected playback device is automatically resumed further responsive to a determination that the media navigation device is within the predetermined distance to the second network-connected playback device.

15. A method comprising:
receiving, at a media navigation device, a request to transfer a playback marker of a media content from a first network-connected playback device to a second network-connected playback device, wherein the media navigation device provides a transfer indicium to enable transmission of a respective command to at least one of the first network-connected playback device or the second-network-connected playback device;
generating, by the media navigation device, a transfer command to cause the first network-connected playback device to transfer the playback marker of the media content from the first network-connected playback device to the second network-connected playback device;
responsive to receiving the transfer command, stopping a playback of the media content on the first network-connected playback device, wherein the playback marker indicates a stop timecode within a timeline associated with the media content at which the playback of the media content is stopped;
generating, by the media navigation device, a play command to resume playback of the media content on the second network-connected playback device at the stop timecode;
sending the play command and the playback marker to the second network-connected playback device; and
responsive to receipt of the play command at the second network-connected playback device, automatically resuming playback of the media content on the second network-connected playback device at the stop timecode.

16. The method of claim 15, further comprising:
generating, with the media navigation device, a graphical user interface configured to render the transfer indicium to enable transmission of the respective command to the at least one of the first network-connected playback device or the second network-connected playback device.

17. The method of claim 16, wherein the graphical user interface is further configured to render a transfer destination menu comprising a set of destination indicia, wherein the set of destination indicia correspond to a set of network-connected playback devices, wherein the set of network-connected playback devices includes the second network-connected playback device, and
wherein the received request to transfer the playback marker comprises a selection of a destination indicium of the set of destination indicia corresponding to the second network-connected playback device.

18. The method of claim 15, wherein the request is received from a touch-based input or an audio-based input at the media navigation device.

19. The method of claim 15, wherein the play command includes an instruction to resume playback of the media content on the second network-connected playback device responsive to the media navigation device being within a predetermined distance to the second network-connected playback device, wherein the playback of the media content on the second network-connected playback device is automatically resumed further responsive to a determination that the media navigation device is within the predetermined distance to the second network-connected playback device.

20. The method of claim 15, wherein the media navigation device is in communication with a first network, wherein the method further comprises:
configuring a server in communication with a second network to receive the playback marker from the first network-connected playback device via the first network, wherein the first network is in communication with the second network; and
configuring the server to send the playback marker to the second network-connected playback device via the second network.

21. A media content system comprising:
a receiver configured to:
receive, via a media navigation device, a request to transfer a playback marker of a media content from a first network-connected playback device to a second network-connected playback device, wherein the media navigation device provides a transfer indicium to enable transmission of a respective command to at least one of the first network-connected playback device or the second-network-connected playback device; and
a processor configured to:
generate, by the media navigation device, a transfer command to cause the first network-connected playback device to transfer the playback marker of the media content from the first network-connected playback device to the second network-connected playback device;
stop a playback of the media content on the first network-connected playback device responsive to the transfer command, wherein the playback marker indicates a stop timecode within a timeline associated with the media content at which the playback of the media content is stopped,
generate, by the media navigation device, a play command to resume playback of the media content on the second network-connected playback device at the stop timecode,
send the play command and the playback marker to the second network-connected playback device, and
responsive to receipt of the play command at the second network-connected playback device, automatically resume the playback of the media content on the second network-connected playback device at the stop timecode.

22. The media content system of claim 21, wherein the play command includes an instruction to resume playback of the media content of the second network-connected playback device responsive to the media navigation device being within a predetermined distance to the second network-connected playback device, wherein the playback of the media content on the second network-connected playback device is automatically resumed further responsive to a determination that the media navigation device is within the predetermined distance to the second network-connected playback device.

* * * * *